(12) United States Patent
Jangsäter et al.

(10) Patent No.: US 11,105,671 B2
(45) Date of Patent: Aug. 31, 2021

(54) DEVICE FOR STORAGE AND DOSAGE OF A POWDER OR A LIQUID

(71) Applicant: DOSERAMERA AB, Årsta (SE)

(72) Inventors: Magnus Jangsäter, Årsta (SE); Martin Carlsson, Knivsta (SE)

(73) Assignee: Doseramera AB, Årsta (SE)

( * ) Notice: Subject to any disclaimer, the term of this patent is extended or adjusted under 35 U.S.C. 154(b) by 0 days.

(21) Appl. No.: 16/629,357

(22) PCT Filed: Jul. 9, 2018

(86) PCT No.: PCT/SE2018/050753
§ 371 (c)(1),
(2) Date: Jan. 8, 2020

(87) PCT Pub. No.: WO2019/013693
PCT Pub. Date: Jan. 17, 2019

(65) Prior Publication Data
US 2020/0141779 A1 May 7, 2020

(30) Foreign Application Priority Data

Jul. 9, 2017 (SE) .................... 1750906-8

(51) Int. Cl.
*G01F 11/26* (2006.01)
*B65D 83/06* (2006.01)
*G01F 15/00* (2006.01)

(52) U.S. Cl.
CPC .............. *G01F 11/26* (2013.01); *B65D 83/06* (2013.01); *G01F 11/261* (2013.01); *G01F 11/262* (2013.01); *G01F 15/001* (2013.01)

(58) Field of Classification Search
CPC ...................................................... B65D 83/06
See application file for complete search history.

(56) References Cited

U.S. PATENT DOCUMENTS 4,961,521 A * 10/1990 Eckman ................. A47G 19/24
128/203.15
5,588,563 A * 12/1996 Liu ....................... G01F 11/261
222/158

(Continued)

FOREIGN PATENT DOCUMENTS

CA         2910472 A1      4/2017

OTHER PUBLICATIONS

International Written Opinion of the International Searching Authority from corresponding International Application No. PCT/SE2018/050753, dated Mar. 12, 2018, 8 pages.

*Primary Examiner* — Jeremy Carroll
(74) *Attorney, Agent, or Firm* — Tucker Ellis LLP (57) ABSTRACT

The present invention refers to a device for storage and dosage of a powder or a liquid, wherein the device comprises a removable top cap, an annular grip portion that encircles an upper part of a main container, which connects and locks to an outer container, which main container is arranged to store an amount of a powder or a liquid and the outer container encircles and connects the main container to a volume container, which volume container is used to adjust a dispensing volume of the device and has a removable bottom cap in its lower end through which the desired amount can be discharged. The invention further relates to the use of such a device.

20 Claims, 6 Drawing Sheets

(56) References Cited

U.S. PATENT DOCUMENTS

| | | | | |
|---|---|---|---|---|
| 5,667,109 A * | 9/1997 | Yu-Mei | ................. | G01F 11/261 |
| | | | | 222/456 |
| 5,944,230 A * | 8/1999 | Chiang | ................. | G01F 11/46 |
| | | | | 222/158 |
| 6,283,339 B1 * | 9/2001 | Morrow | ................. | G01F 23/24 |
| | | | | 222/142.9 |
| 6,378,735 B1 * | 4/2002 | Chu | ................. | B65D 47/265 |
| | | | | 141/381 |
| 6,601,734 B1 * | 8/2003 | Smith | ................. | A47G 19/34 |
| | | | | 222/142.9 |
| 7,748,579 B1 * | 7/2010 | Shin | ................. | G01F 11/261 |
| | | | | 222/450 |
| 9,828,230 B2 * | 11/2017 | Ismail | ................. | A47J 47/01 |
| 2015/0021349 A1 * | 1/2015 | Sanders | ............ | B65D 83/0409 |
| | | | | 221/1 |

\* cited by examiner

DEVICE FOR STORAGE AND DOSAGE OF A POWDER OR A LIQUID

This invention refers to a device for storage and dosage of a powder or a liquid, wherein the volume to be discharged can be adjusted.

BACKGROUND OF THE INVENTION

Traditionally, measuring of a powder or a liquid has been done with a measuring spoon or other type of measuring mechanism. The powder or liquid is stored in one container and then the user must use a separate measuring device to get the desired amount of powder or liquid.

The present inventors have found that there exists a need for an easier and faster way to measure and dose or dispense an amount of a powder, such as a gruel powder, infant formula, protein powder or a detergent powder, or a liquid, such as a fluid detergent, where the container for the powder or liquid can also be used for storage of the powder or liquid.

Traditional methods have been to either measure the desired amount for each time or to use a container with several separated compartments, wherein the content of the compartments can be emptied individually. This would however require that the compartments have been pre-filled with the desired amount of content at an earlier stage. It is for example common that parents bring hot water in a thermos (or other equivalent container) and gruel powder or infant formula in another container to make it possible to fast prepare a meal for an infant. It is also common for athlete to bring protein powders in a container to mix with water before, during and/or after a workout. In both cases, the powder must be measured in advance using appropriate measuring equipment and then be stored in a different container.

The products available on the market today all have some drawbacks which the present invention serves to overcome.

US 2015/0014349 describes a container for dispensing spices, which container comprises multiple chambers with fixed volumes. The container further includes a discharging mechanism that selectively opens at least one of the multiple chambers. In US 2015/0014349 a selected volume of contents is measured with a container by rotating a dial located on an underside of multiple chambers in a rotatable drum of the container to open a selected number of the multiple chambers. A disadvantage with this container is that there is low flexibility in the amount of content that can be dosed since all chambers comprises the same volume. The user can then choose to use for example 1 milliliter, 2 milliliters or 3 milliliters by discharging the volume of 1, 2 or 3 chambers. It is however not possible to discharge for example 1.5 or 2.75 milliliter. Since the container is designed for spices, the volume contained in the chambers is also very small. To be able to dose larger volumes, the user would have to re-fill and dose the multiple chambers more than one time.

An alternative is described in US 2014/0339267, which describes a dispenser for dispensing precise amounts of a powder. The device in this case is a hollow container divided into a holding chamber and a dispensing chamber by a longitudinally-extending divider, and a metering wheel attached to a lower end of the container, wherein the metering wheel includes a plurality of wells configured to receive powder stored in the holding chamber. By rotating the metering wheel relative to the container, it is possible to move the wells from a position beneath the holding chamber to a position beneath the dispensing chamber. When the metering wheel is located beneath the holding chamber they are filled with powder and when the metering wheel is rotated the user can choose how many wells that are to be turned into the dispensing chamber, the dispenser must then be inverted to let the powder into and through the dispensing chamber and out of an opening. One problem with this device is that it is not adapted to be used with liquids. The dispenser is further not adapted for dosage of for example half a cup or the like, it must be at least one full chamber.

US 2012/0292314 and U.S. Pat. No. 4,573,506 both describes containers that can be used for storing a powder or a liquid, but none of them can be used for direct dosage of the content.

U.S. Pat. Nos. 4,961,521, 5,944,230, 5,667,109, 5,588,563 and 5,378,735 all shows different types of containers where the product can be used for both storing and dosage of the content. However, all of these products show the drawback that they need to be turned upside down several times, either to be filled or to pour the content out of the container.

One problem with this is that it increases the risk that the content, especially when it is a fine-grained powder, ends up in the mechanism used to close and open or adjust the device. Another problem with products on the market today is that the hole where the product leaves the container or goes through to a second container are rather small, which makes it difficult to get all the contents out of the container.

A further problem with products on the market is that it is not possible to set a certain amount in advance and keep the setting until the device is to be used the next time.

The present invention solves these and other problems.

Hence, one aspect of the present invention is a device for storage and dosage of a powder or a liquid, wherein the device comprises a removable top cap, an annular grip portion that encircles an upper part of a main container which connects and locks to an outer container, which main container is arranged to store an amount of a powder or a liquid and the outer container encircles and connects the main container to a volume container, which volume container is used to adjust a dispensing volume of the device and has a reIs movable bottom cap in its lower end through which a desired amount can be discharged.

In a further embodiment of the invention, the removable top cap is provided with locking means and the main container is provided with locking means to detachably attach the top cap to the main container.

In another embodiment of the present invention, the volume to be discharged of the device is adjusted by rotating the volume container in relation to the main container, or by sliding the volume container upwards or downwards in relation to the main container; wherein the volume container and the outer container comprises cooperating first and second means to adjust the total volume of the device.

The embodiment described herein comprises a device that allows a user to dispense an accurate amount of desired content in a container in a quick and easy way, without the need of any other measuring equipment. The device according to the present invention can be used to both store and dose the content.

In the following, the invention will be described in detail, with reference to exemplifying embodiments of the invention and to the enclosed drawings, in which:

FIG. 5 shows a view of a specific embodiment of the bottom of the main container For the purpose of this description and claims the main axis is defined as the vertical axis going through the center of the device as oriented in FIGS. 1A and B. The terms "upper", "lower", "top", "bottom", "downwards", "upwards" and any derivatives thereof relate to the invention as oriented in FIGS. 1A and B.

Referring to FIGS. 1-4 a device 1 in accordance with the present invention suitably comprises a top cap 2, an annular grip portion 3 that connects and locks a main container 4 to an outer container 5. The main container 4 is a container for storing the content that is to be dosed using the device. The outer container 5 encircles and connects the main container 4 to a volume container 6. The volume container 6 is used to adjust the volume of the device 1 and has a bottom cap 7 in the lower end.

Figure 1A:
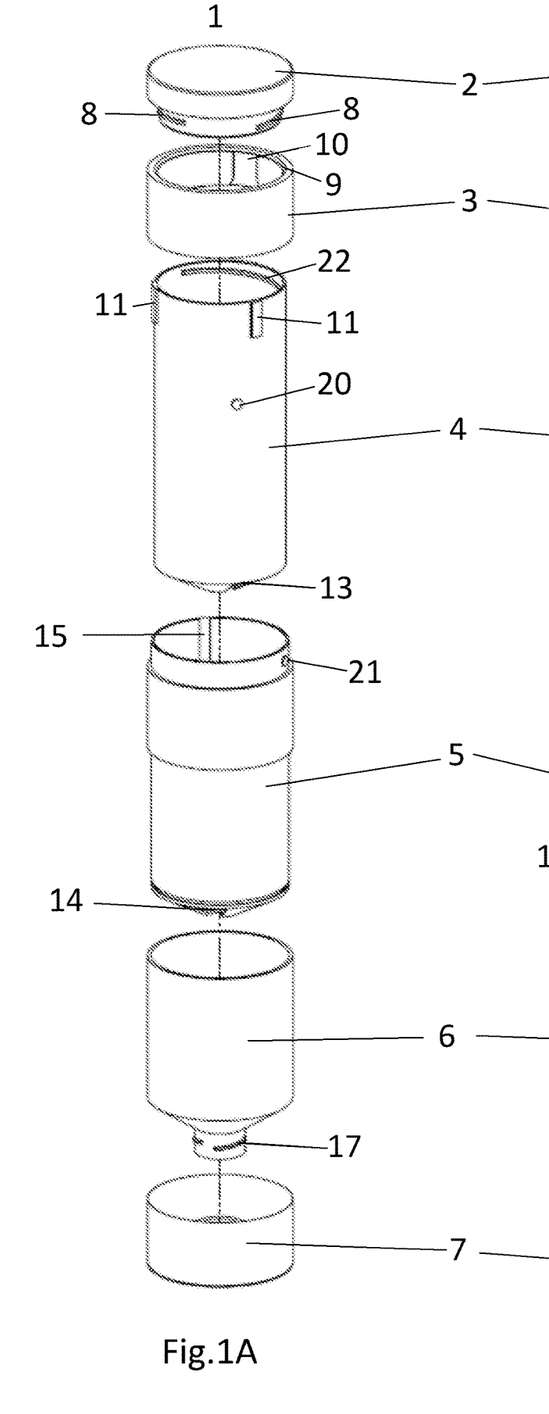
FIG. 1A shows an exploded view of the device.
Figure 1B:
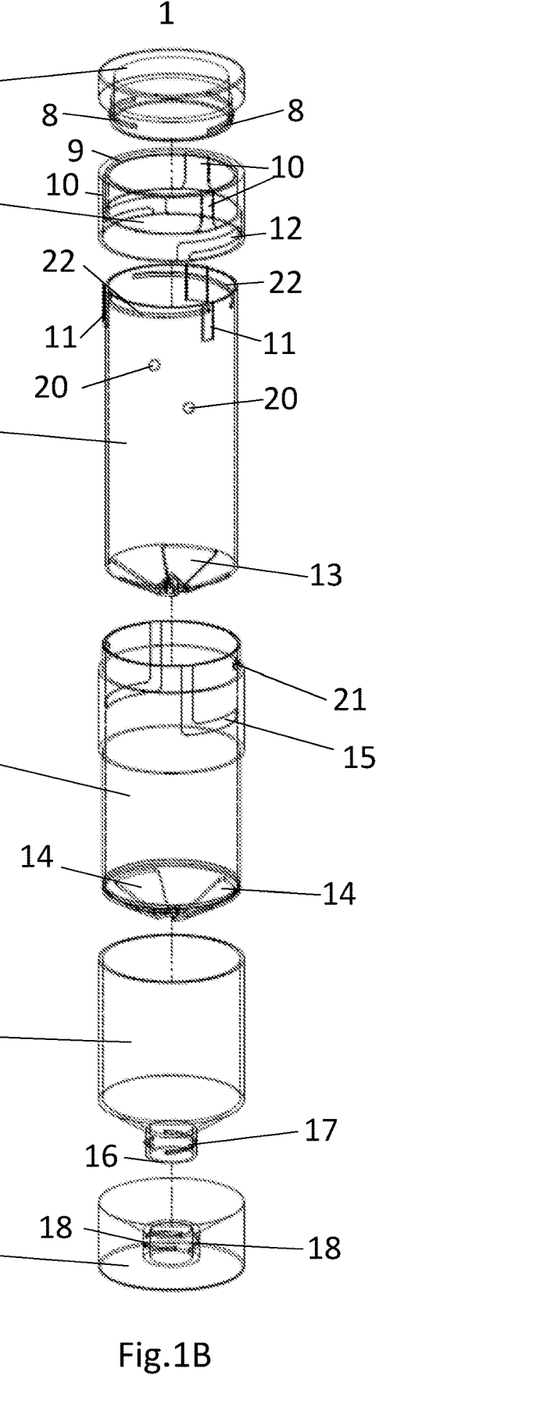
FIG. 1B shows an exploded view of the device with transparent walls.

FIG. 1A shows an exploded view of the device. FIG. 1B shows the same embodiment but with transparent walls to also show the inner parts of the device 1. The top cap 2 of the device 1 can be opened to fill the main container 4 of the device 1 with a powder or a liquid.

The top cap 2 is then closed and the device can be stored until it is needed. The top cap 2 is provided with means 8 to detachably attach the top cap 2 to the main container 4, which main container 4 is provided with locking means 22. The means 8 can for example be a locking means or a thread, but also other means to attach the top cap 2 to the main container 4 can be used. The top cap 2 should preferably be tightly attached so that the content inside the device does not leak. The top cap 2, as well as any of the other parts of the device, can further be provided with a gasket (not shown) to ensure that the device does not leak if it is placed in a bag or the like. The gasket is preferably made of a suitable rubber or plastic material.

A gasket can further be used on one or more of any of the top cap 2, the annular grip portion 3, the main container 4, the outer container 5, the volume container 6 and the bottom cap 7.

The top cap 2 can be detachably attached to the top of a main container 4. The upper part of the main container 4 is surrounded by a grip portion 3. The grip portion 3 is preferably a hollow cylindrical part which is open in both the top and the bottom. The annular grip portion 3 creates a grip surface and locks the main container 4 to the outer container 5 by a pushing rotating motion in clock-wise/counter-clockwise direction. A pulling rotating motion in clockwise/counter-clockwise direction will unlock the parts from each other and it is then possible to take apart the different parts of the device 1. The bottom end of the annular grip portion 3 can be attached to a main container 4.

The annular grip portion 3 is preferably further provided with at least one reception means 10 to detachably attach the annular grip portion 3 to a main container 4. The at least one reception means 10 can for example be a recess or indentation wherein at least one projecting means 11 on the main container 4 is adapted to fit in the reception means 10. When the device is assembled the annular grip portion 3 is placed over the top of the main container 4 and pushed into position so that the at least one projecting means 11 of the main container 4 is pushed into place in the at least one means reception 10 on the annular grip portion. It is also possible that the at least one receptions means 10 are placed on the main container 4 and the at least one projecting means 11 on the annular grip portion 3.

The embodiment shown in FIGS. 1A and 1B shows that the annular grip portion 3 is provided with three reception means 10. In this embodiment two of the reception means 10 have one width and the third reception means 10 has a different, wider width. In a similar way, the projecting means 11 have been adapted to be of corresponding width. This means that the annular grip portion 3 can only be attached to the main container 4 in one specific position, wherein the widest projecting means 11 must be placed in the widest reception means 10. When the widest projecting means 11 is placed in the widest reception means 10 and the annular grip portion 3 is rotated, a means 20 on the main container 4 cooperates with a means 21 on the outer container 5 to show if the device is in an open or closed position.

The annular grip portion 3 can further be provided with at least one locking groove 12 to lock the annular grip portion 3 to the outer container 5, which prevents the main container 4 from unintentionally detaching. The locking groove 12, on the annular grip portion 3 cooperates with a corresponding locking groove 15 on the outer container 5 to prevent unintentionally detaching and to limit the rotation of the main container 4 in relation to the annular grip portion 3 during opening and closing.

The annular grip portion 3 can further be provided with an inwards projecting edge also on the lower end (not shown), whereby a locking means can be placed on the inside of the outer container 5 and cooperate to create a tight leak-proof seal.

The main container 4 is preferably a hollow cylindrical container with an open top end and a lower end with at least one opening 13 to let the content pass through to the outer container 5 when it is placed in an open position. The main container 4 can be attached to the annular grip portion 3 in the upper end and to an outer container 5 in the lower end. The annular grip portion 3 can further be used to change the position of the main container 4 in relation to the outer container 5, from a closed position, wherein the at least one opening 13 in the bottom of the main container 4 is displaced so that there is no overlap with the at least one opening 14 on the outer container 5, to an open position, wherein the at least one opening 13 in the bottom of the main container 4 at least partly overlaps with the at least one opening 14 in the bottom of the outer container 5. The bottom of the main container 4 is preferably conical, as can be seen in FIGS. 1A-B and 2A-C. The conical shape is preferred to facilitate for the content of the container to move through the openings 13 and 14 into the volume container 6.

The device according to the present invention, where the content is filled from the top (as shown in FIGS. 1A and B), enters the main container, goes through the openings in the main container and outer container into the volume container before it leaves the device in the bottom through opening 16, makes it possible to fill, store and use the device without the need to turn it upside down several times. Existing products on the market are made so that the content is both filled from and leaves the device from the top, meaning that the device must be turned upside down more frequently to be used. By placing the parts of the device in the order shown in this application, results in a lower risk of content falling into the mechanics of the device, since there is no need to turn the device upside down as many times. If the content, especially any powder, gets stuck in the mechanism, for example in the threads, it will be harder to rotate the different parts and to open/close the device.

The main container 4 can be provided with means 22 on the inside that cooperates with the means 8 on the outside of the lower part of the top cap 2. The means 22 can either be an inwards projecting upper edge, threads or any other means that locks the top cap 2 to the main container 4 by co-operating with the means 8. In the case where the means 8 is a locking means, the top cap 2 is placed in the upper open end of the main container 4 and pushed downwards so that the locking means 8 are pushed under the inwards projecting upper edge 22 and thereby detachably attached to the main container 4. To detach the top cap 2, the top cap 2 is pulled upwards so that the locking means 8 again are pushed over the inwards projecting upper edge 22 until the top cap 2 can be fully detached. In the case where the means 8 are threads, the means 22 are also threads and the top cap 2 is placed in the upper open end of the main container 4 and rotated in a clock-wise direction, the thread 8 on the top cap 2 cooperates with the threads 22 inside the main container 4 to lock the top cap 2 to the main container 4. It should be noted that the means 8 to detachably attach the top cap 2 to the main container 4 could also be located inside of the top cap 2 and in that case the means 22 on the main container 4 should be located on the outside.

The main container 4 can also be provided with means 20 to show if the device is in an open position, where the content can be poured out of the bottom opening, or in a closed position where the at least one opening 13 in the bottom of the main container 4 is in a closed position. These means cooperate with means on the outer container 5.

The outer container 5 is preferably a hollow cylindrical container with an open top end and a lower end with at least one opening 14 to let the content pass through to a volume container 6 when it is placed in an open position. The outer container 5 constitutes a grip surface in which the user can hold the device 1 in or with one hand while turning either the main container 4 or the volume container 6 or while removing either the top cap 2 or the bottom cap 7. The outer container 5 holds the main container 4. When the outer container 5 is turned/rotated in relation to the main container 4, whereby the at least one opening 13 in the bottom of the main container 4 and the at least one opening 14 in the bottom of the outer container 5 can be aligned to create at least one opening into the volume container 6.

The outer container 5 is further provided with at least one locking groove 15 to lock the main container 4 to the outer container 5 which holds the main container 4. This locking prevents the different parts 3,4,5 of the device 1 from unintentionally detaching from each other. The locking groove 15 will also function as a limitation with regard to the rotation of the outer container 5 in relation to the annular grip portion 3 during opening and closing of the openings 13,14 of the device 1.

The outer container 5 also comprises first means 23 to change the total volume of the device 1. The first means 23 are present on the outside of the outer container 5 and cooperates with second means 24 on the inside of the volume container 6. The means 23 and 24 are described more in detail with reference to FIG. 4A-B below.

The outer container 5 can also be provided with a graded scale 19 (not shown) either on the inside or outside to show the user the amount of content that will be discharged.

The graded scale can also be provided on any of the other parts 2,3,4,6 or 7 on the inside and/or outside to show the user the amount of content that will be discharged.

The bottom of the outer container 5 matches the shape of the bottom of the main container 4 and is preferably conical, as can be seen in FIGS. 1A-B and 2A-C. The conical shape is preferred to facilitate for the content of the containers 4,5 to be transferred into the volume container 6.

The outer container 5 can also be provided with means to show if the device is in an open position, where the content can be poured out of the bottom opening, or in a closed position where the at least one opening in the bottom of the main container 4 is in a closed position. These means cooperate with means on the main container 4.

The volume container 6 is preferably a hollow cylindrical container with an open top wherein the outer container 5 fits. The volume container 6 comprises second means 24 to change the total volume of the device 1. The second means 24 are present on the inside of the volume container 6 and cooperates with first means 23 on the outside of the outer container 5. The means 23 and 24 also has the function of attaching the outer container 5 to the volume container 6. The means 23 and 24 are described more in detail with reference to FIG. 4A-B below. The volume container 6 can also be provided with a graded scale 19 either on the inside or outside to show the user the amount of content that will be discharged.

The graded scale can be changed before production to adapt the scale to the intended use and to the standard scale (metric, avoirdupois, United States customary units or any other units) that is used in the area where the product is to be sold. The graded scale can for example show tablespoons or teaspoons, ml or cl, cups or oz. It would also be possible to have a weight scale such as g, ounce, pound or the like. The person skilled in the art understands that any unit used to measure a powder, powder like or liquid content can be used.

The scale can also be adapted to show a half unit, a ¼ unit or the like. The bottom of the volume container 6 is preferably tapered and conical and ends in an opening 16. The opening is in this application shown as a circular opening, but can have any shape as long as the bottom cap 7 is adapted to fit to the opening and does not leak.

The volume container 6 can be provided with means 17 to detachably attach the volume container 6 to a bottom cap 7. The means 17 can for example be a locking means or a thread, but also other means to attach the volume container 6 to the bottom cap 7 can be used.

The opening of the volume container 6 can be closed with a bottom cap 7. The bottom cap 7 can be provided with means 18 on the inside of the bottom cap 7 to co-operate with the means 17 on the volume container 6. The means 18 can either be an inwards projecting upper edge, threads or any other means that locks the bottom cap 7 to the volume container 6 by co-operating with the means 17. In the case where the means 17 are locking means, the bottom cap 7 is placed on the lower open end of the volume container 6 and pushed upwards so that the locking means 17 are pushed under the inwards projecting upper edge 18 and thereby detachably attached to the bottom cap 7. To detach the bottom cap 7 the bottom cap 7 is pulled downwards so that the locking means 17 again are pushed over the inwards projecting upper edge until the bottom cap 7 can be fully detached. In the case where the means 17 are threads, the bottom cap 7 is placed in the lower open end of the volume container 6 and rotated in a clock-wise direction, the thread inside the bottom cap 7 cooperates with the threads on the outside of the opening 16 on the volume container 6 to lock the bottom cap 7 to the volume container 6. It should be noted that the means 18 to detachably attach the bottom cap 7 to the volume container 6 could also be placed on the outside of the bottom cap 7 and in that case the means 17 on the volume container 6 should be placed on the inside.

The bottom cap 7 also functions as a stand for the device 1. The bottom cap 7 prevents the content of the device to leak out of the opening of the volume container 6. The bottom cap 7 is to be opened when the desired amount of content is to be discharged.

Figure 2A:
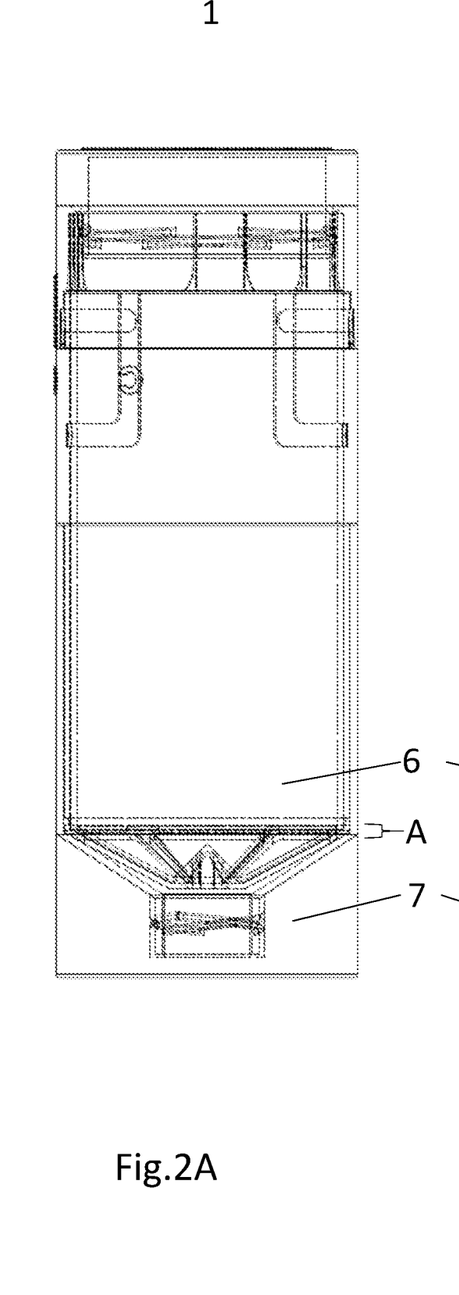
FIG. 2A shows an embodiment of the device in a minimum volume state.
Figure 2B:
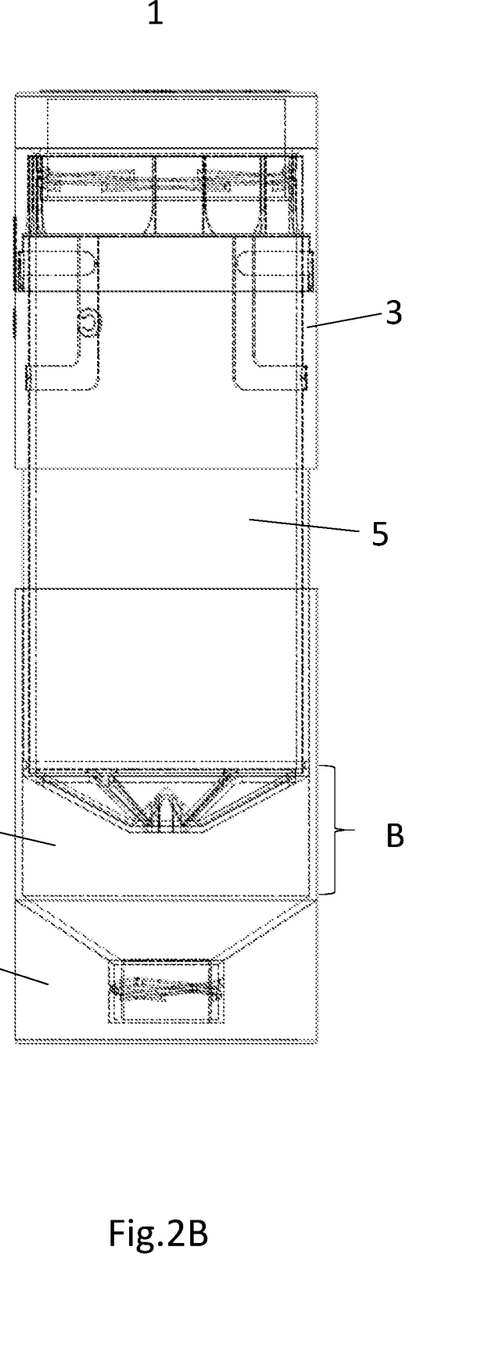
FIG. 2B shows an embodiment of the device in a medium volume state.
Figure 2C:
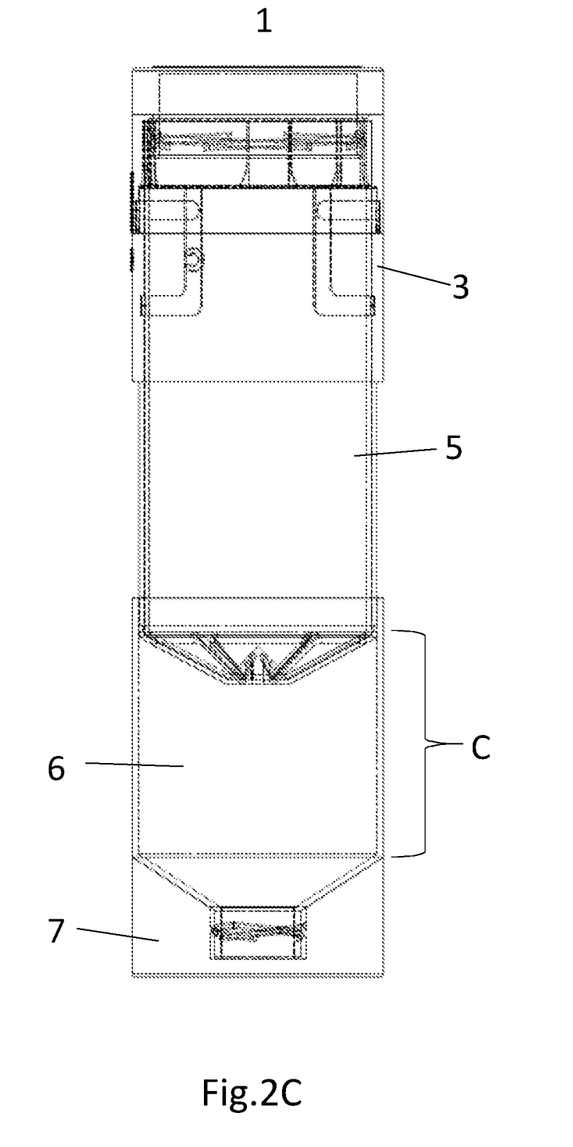
FIG. 2C shows an embodiment of the device in a maximum volume state.

FIG. 2A-C shows the device 1 where the total volume of the device is adjusted. FIG. 2A shows the device in the most compact version, wherein the volume container 6 holds a minimum amount of content that fits in the space A. FIG. 2B shows the device 1 wherein the volume container 6 can hold an amount of content that fits in the space B. FIG. 2C shows the device 1 in the most expanded version wherein the volume container 6 holds the maximum amount of content, i.e. the content that fits in the space C. The volume container 6 decides the amount of content that will be dosed when the bottom cap 7 is removed. To change the volume that fits in the volume container 6, the volume container 6 can be rotated either in a clockwise-direction or in a counter-clockwise direction, whereby a first means 23 on the outer container 5 and a second means 24 on the volume container 6 cooperate.

Figure 3A:
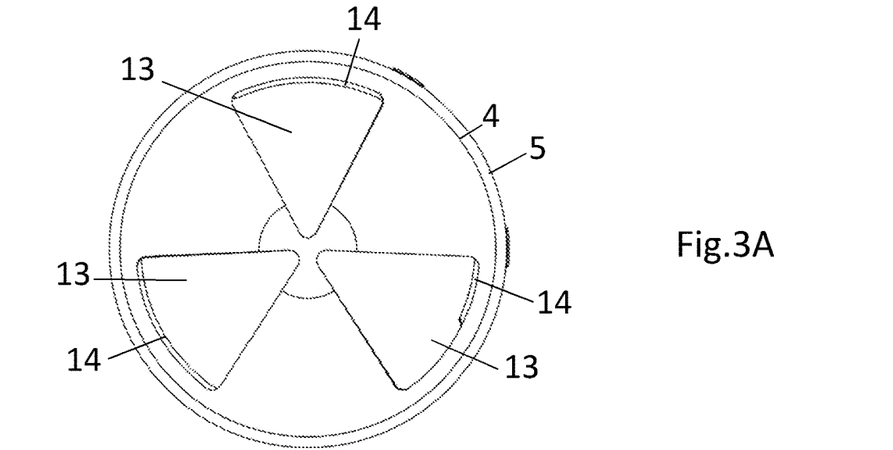
FIG. 3A shows a top view of the main container attached to the outer container and rotated to an open position.
Figure 3B:
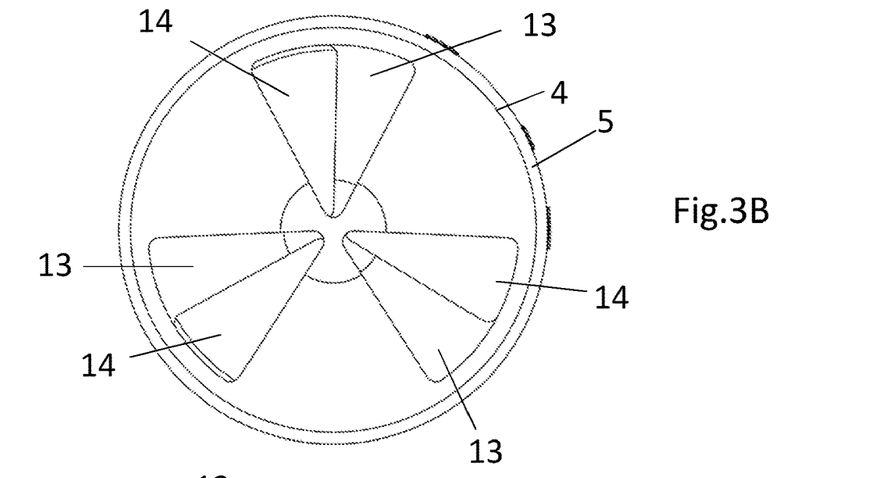
FIG. 3B shows a top view of the main container attached to the outer container and rotated to a half-open position.
Figure 3C:
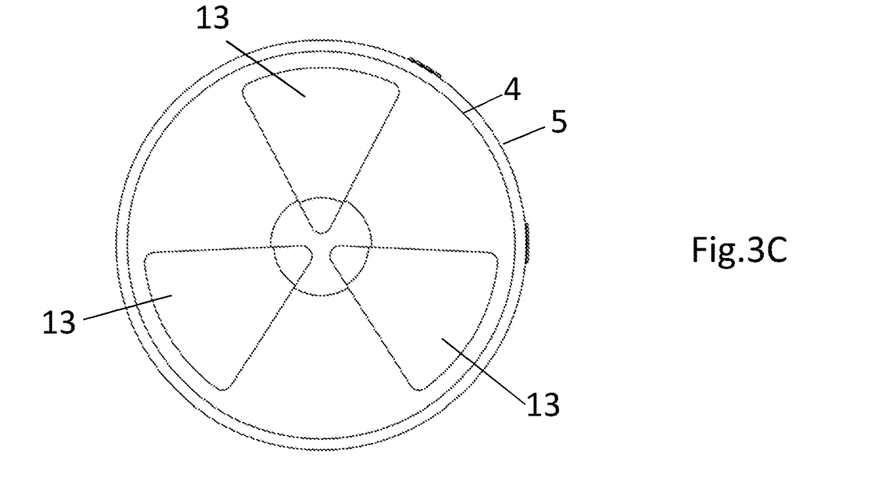
FIG. 3C shows a top view of the main container attached to the outer container and rotated to a closed position.

FIGS. 3A, 3B and 3C shows the device in an open, half-open and closed position, respectively as seen from above when the device 1 is assembled without the top cap 2. In this description, an "open position" is described to be a position wherein it is possible for the content to pass through the opening in the outer container 5 into the volume container 6. A "half-opened position" is where the device is in a position where the outer container 5 has been partly rotated so that only a part of the at least one opening is open into the volume container 6. A "closed position" is wherein the openings in the main container 4 is closed and it is not possible for the content to pass through to the volume container 6.

The main container 4 can be rotated by turning the annular grip portion 3 and thereby align the opening 13 of the main container 4 with the opening 14 of the outer container 5, whereby the volume to be discharged is transferred from the main container 4 to the volume container 6.

To achieve an open position the at least one opening 13 of the main container 4 must be aligned with the at least one opening 14 on the outer container 5, as shown in FIG. 3A. The number of openings in the bottom of the main container 4 and the outer container 5 can be adapted depending on the intended use. In the embodiment shown in this application the device is provided with three openings in the bottom of the main container 4 and the outer container 5, respectively. It as preferred to have openings as large as possible to facilitate the contents to be moved to the next container or to leave the device. With a smaller opening it is harder to get the content through to the next container or out of the device. The product must be turned in different directions to get the content through the opening. It is therefore an advantage to have one or several larger openings in the bottom of the containers. FIG. 3B shows the case where the openings 13 in the bottom of the main container 4 partly overlaps with the openings 14 in the bottom of the outer container 5. FIG. 3C shows the device 1 in a closed position, where there is nearly no overlap between the openings 13 in the bottom of the main container 4 and the openings 14 in the bottom of the outer container 5. This is the position that is used when the device is to be filled and when it is stored.

Figures 4A, 4B:
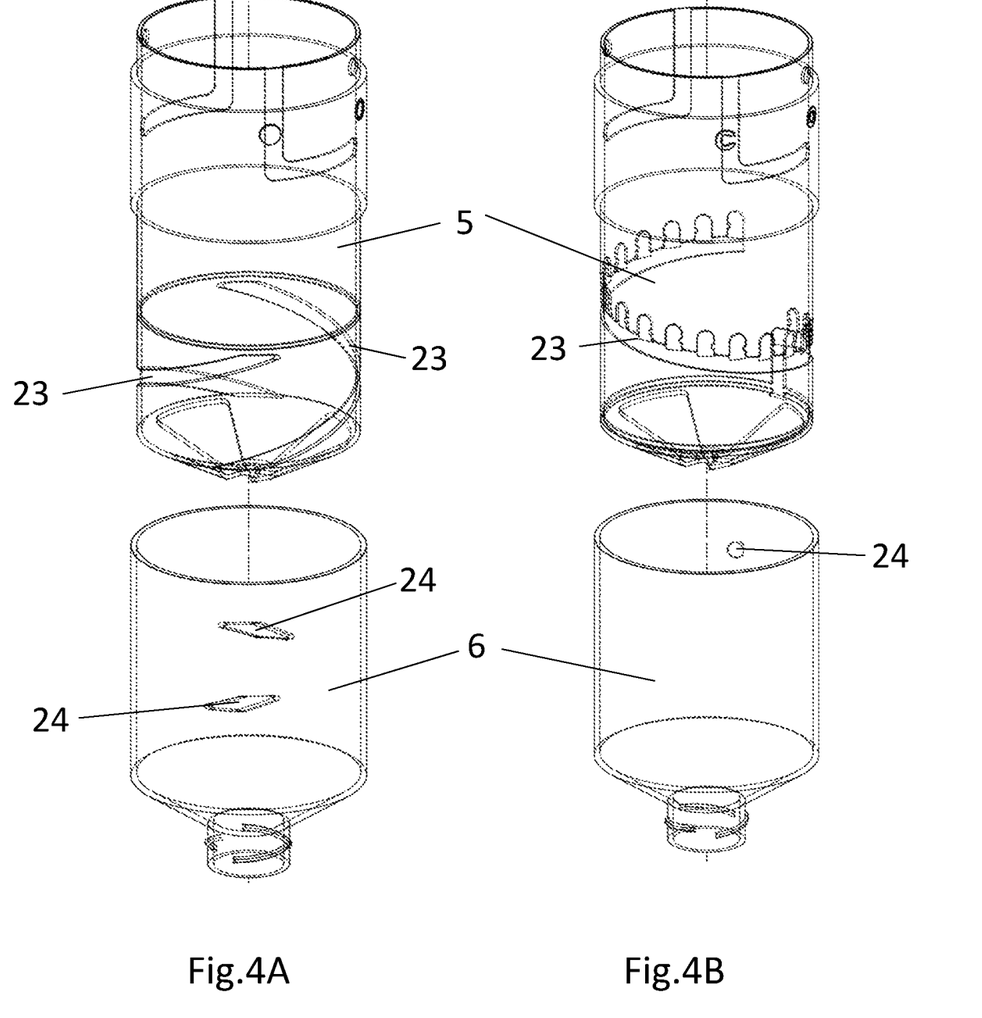
FIG. 4A shows an exploded view of a part of the device.
FIG. 4B shows an exploded view of a part of the device with transparent walls.

FIG. 4A-B shows the outer container 5 and the volume container 6 in exploded views, wherein FIG. 4B is shown with transparent walls. FIGS. 4A and B shows that the means 23 and 24 can for example consist of projections and indentations in a spiral or helix shaped manner. The total volume of the device 1 can be adjusted by rotating the volume container 6 in relation to the main container 4, wherein the volume container 6 and the outer container 5 comprises cooperating first and second means 23, 24 to adjust the total volume of the device 1, which first means 23 is arranged in a vertically rising spiral around the circumferential of the outside of the outer container 5 and the second means 24 is arranged in a vertically rising spiral around the circumferential of the inside of the volume container 6. To increase the volume, the volume container 6 is rotated either counter clockwise or clockwise in relation to the outer container 5 until the desired amount is reached. Since the means 23 and 24 are arranged in a vertically rising spiral, the rotational movement of the volume container 6 will move the volume container 6 downwards, away from the outer container 5, and thereby increase the volume that fits in the volume container 6. To decrease the amount the volume container 6 is rotated clockwise and the volume container 6 will move upwards towards the main container 4 and the volume that can be discharged or dosed will thereby decrease. The first and second means 23, 24 can be arranged to define pre-defined positions deciding the volume to be discharged. This can for example be done if one of the first and second means are provided with indentations and the other of the first and the second means are provided with projections, wherein the projections cooperates and fits in the indentations.

In regular containers, the bottom of the container is flat. When the content in one container is to be brought into the next container, through openings in the bottom, some of the content will stay on the flat bottom. To make sure that all, or at least most of the content enters the next container, the product must be turned, twisted or shaken. This problem can be solved by having a bottom plate of each container that has a conical shape. The conical shape, where the center of the bottom is lower than the edges, gives the technical effect that it is easier for the content to flow through the openings into the next container.

Figure 5:
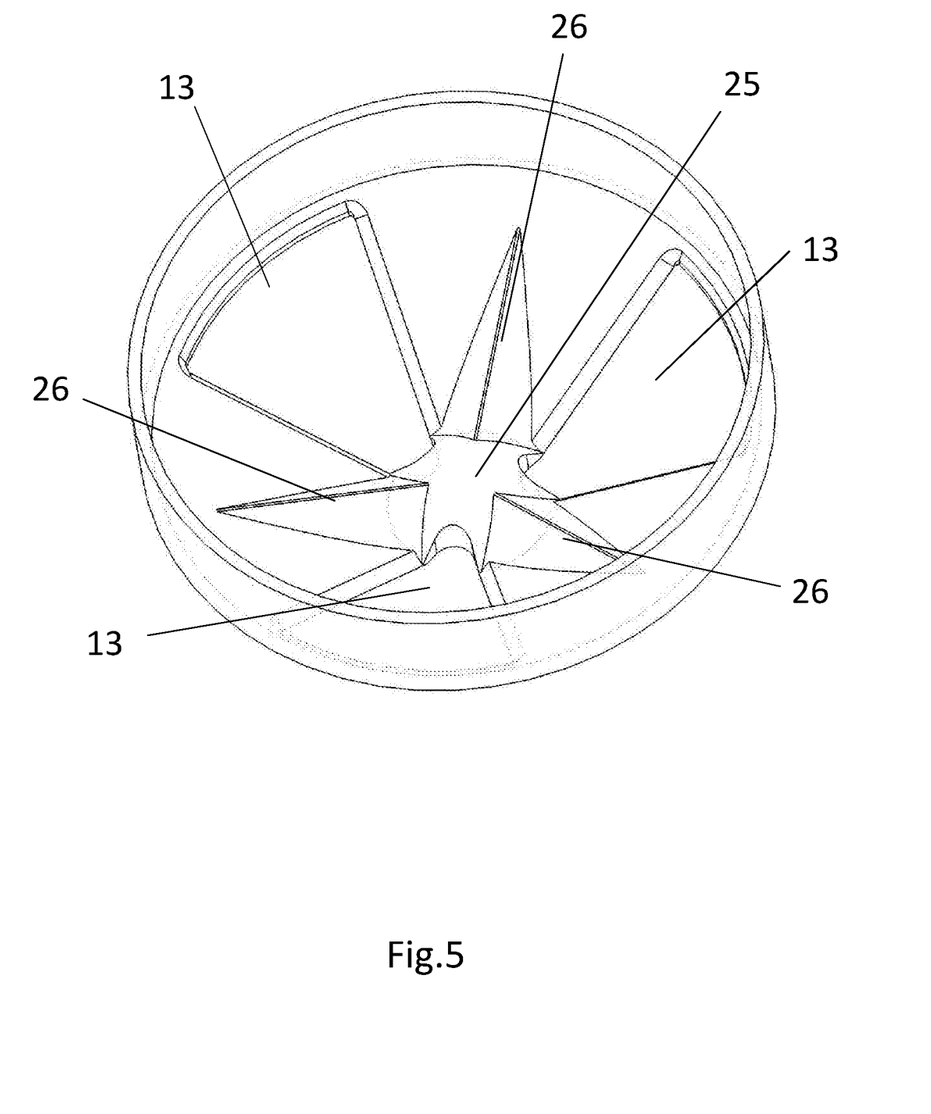

FIG. 5 shows a specific embodiment of the bottom of the main container 4. As mentioned above, the bottom of the main container, as well as the outer container and the volume container has a conical shape. This conical shape can also be seen for example in FIGS. 2A-C. In the specific embodiment shown in FIG. 5, the bottom of the main container has been further provided with a flow improving means 25 in the center. The flow improving means 25 is provided to further improve the flow of content into the next container. The flow improving means directs the content into the openings 13 of the bottom plate in the main container by having a raised center which slopes down towards the openings 13 in the bottom of the main container 4. The flow improving means shown in FIG. 5 is further provided with three projecting means 26 between two openings 13 to further direct the content towards and through the openings, when the device is in an open position. The flow improving means 25 can also be used without the projecting means 26 or it can have more or less than three projecting means. The slope of the flow improving means 25 as well as the projecting means 26 can be adapted by a person skilled in the art.

In the embodiments shown in this invention, the adjustment of the total volume of the device 1 corresponds to the adjustment of the volume of the volume dispenser 6. Hence, when the volume dispenser 6 is moved downwards and the volume of the volume dispenser 6 is increased, the total volume of the device 1 is increased with the same volume, and when the volume of the volume dispenser 6 is decreased, the total volume of device 1 is decreased with the same volume.

In another embodiment (not shown), the first means 23 on the outer container 5 is a vertical groove and the second means 24 on the volume container 6 is a projecting means that fits in the groove 23 on the outer container 5. To increase the volume that fits in the volume container, the volume container 6 can be extended by pulling the volume container 6 downwards, whereby the projecting means 24 is carried downwards along the groove 23 of the outer container 5.

To decrease the volume that fits in the volume container 6, the volume container 6 is pushed upwards against the outer container 5, whereby the projecting means 24 is carried upwards along the groove 23 of the outer container 5.

The means 23 and 24 are designed to together create pre-defined positions deciding the volume to be discharged through the opening 16 of the volume container 6. These volumes correspond to a graded scale 19 that can be provided on any of the parts 2,3,4,5,6 or 7 on the inside and/or the outside to show the user the amount of content that will be discharged.

The device according to the present invention can be easily disassembled, is easy to clean and to assemble again.

The device 1 can be filled with the desired content by removing the top cap 2 of the device 1 and pour in the powder or liquid. The content is poured into the main container 4 where after the top cap 2 can then be closed and the device can then be used to store the content until it is needed for use. When the device is closed it does not leak, it is therefore possible to put it in a bag, trolley or the like without risking the content to leak out of the device. When the device is used for a powder or other dry content, the device itself is leakproof without any need for additional means. When the device is to be used for liquids it can be equipped with gaskets or the like.

When the device is to be used, the user either rotates the volume container 6 or withdraws the volume container 6 away from the outer container 5 until the desired volume is set, that is the volume to be discharged. Thereafter the amount of content is dosed into the volume container 6 by aligning the at least one opening 13 of the main container 4 with the at least one opening 14 of the outer container 5. This is done by rotating the annular grip portion 3. When the opening 13 and the opening 14 are aligned the powder or liquid transfers through the at least one opening 14 and fills the volume container 6.

The volume to be discharged of the device 1 can be adjusted by rotating the volume container 6 in relation to the main container 4 or by sliding the volume container 6 upwards or downwards in relation to the main container 4; wherein the volume container 6 and the outer container 5 comprises cooperating first and second means 23,24 to adjust the total volume of the device 1.

When the volume container 6 is filled with the powder or liquid, the desired volume (volume to be discharged) has been reached. The annular grip portion 3 is then rotated clockwise or counter-clockwise to place the device 1 in a state where the at least one opening 13 of the main container 4 and the at least one opening 14 of the outer container 5 are in a closed position. The device 1 is then turned upside down so that the bottom cap 7 is facing upwards. The bottom cap 7 can then be removed and the content of the volume container 6 can be discharged (emptied) through the opening 16 into the intended location or external container. The bottom cap 7 is then attached again and the device 1 can be stored until next use.

In this application, the powder has been described to be for example a gruel powder, infant formula, protein powder or a detergent powder. The person skilled in the art understands that also other types of powders, powder-like formulas or dry content suitable to be dispensed can be used in the device. Examples of such other "dry content suitable to be dispensed" can be rice, salt, flour, oats etc. In the same way, a liquid has been described to be a fluid detergent, but the person skilled in the art understands that the container can also be used for other liquid formulations.

The device 1 according to the present invention is preferably made in a transparent material, such as plastic or glass, to facilitate for the user to see the amount content that is left in the container. As, the person skilled in the art understands, it is however possible to use any suitable material.

It is also possible to add electronic equipment to the device 1 to electronically measure the volume, or the weight of the volume, to be discharged, instead of having a graded scale on either the insider or outside of the device. A person skilled in the art would be able to add this feature to the device 1 described herein.

The invention claimed is:

1. A device for storage and dosage of a powder or a liquid, the device comprising a removable top cap, an annular grip portion that encircles an upper part of a main container, which connects and locks to an outer container, which main container is arranged to store an amount of a powder or a liquid and the outer container encircles and connects the main container to a volume container, which volume container is used to adjust a dispensing volume of the device and has a removable bottom cap at a lower end of the volume container through which a desired amount can be discharged, wherein the volume to be discharged of the device is adjusted by rotating the volume container in relation to the main container or by sliding the volume container upwards or downwards in relation to the main container; wherein the volume container and the outer container comprises cooperating first and second means to adjust the total volume of the device, and wherein the first means is arranged in a vertically rising spiral around the circumferential of the outside of the outer container and the second means is arranged in a vertically rising spiral around the circumferential of the inside of the volume container.

2. A device according to claim 1, wherein the top cap is provided with locking means and the main container is provided with locking means to detachably attach the top cap to the main container.

3. A device according to claim 1, wherein the top cap, the annular grip portion, the outer container, the volume container and/or the bottom cap further comprises at least one gasket.

4. A device according to claim 1, wherein the volume container comprises pre-defined positions deciding the volume to be discharged.

5. A device according to claim 1, wherein the annular grip portion is provided with reception means and the main container is provided with projecting means, and wherein the projecting means fits in the reception means.

6. A device according to claim 1, wherein the annular grip portion is further provided with at least one locking groove to lock the annular grip portion to the outer container and the main container, wherein the locking groove of the annular grip portion cooperates with a corresponding locking groove on the outer container and the locking groove of the annular grip portion and the locking groove on the outer container together limit the turning motion of the main container in relation to the grip portion.

7. A device according to claim 1, wherein the main container can be rotated by turning the annular grip portion and thereby align an opening of the main container with an opening of the outer container, whereby the volume to be discharged is transferred from the main container to the volume container.

8. A device according to claim 1, wherein the bottom of the main container and the outer container has a conical shape.

9. A device according to claim 1, wherein a graded scale is provided on any of the removable top cap, annular grip portion, main container, outer container, volume container, or bottom cap on the inside and/or outside to show the user the amount of content that will be discharged.

10. A device according to claim 1, further comprising a flow improving means in the center of the bottom of the main container.

11. A device for storage and dosage of a powder or a liquid, the device comprising a removable top cap, an annular grip portion that encircles an upper part of a main container, which connects and locks to an outer container, which main container is arranged to store an amount of a powder or a liquid and the outer container encircles and connects the main container to a volume container, which volume container is used to adjust a dispensing volume of the device and has a removable bottom cap at a lower end of the volume container through which a desired amount can be discharged, wherein the annular grip portion is further provided with at least one locking groove to lock the annular grip portion to the outer container and the main container, wherein the locking groove of the annular grip portion cooperates with a corresponding locking groove on the outer container and the locking groove of the annular grip portion and the locking groove on the outer container together limit the turning motion of the main container in relation to the grip portion.

12. A device according to claim 11, wherein the top cap is provided with locking means and the main container is provided with locking means to detachably attach the top cap to the main container.

13. A device according to claim 11, wherein the top cap, the annular grip portion, the outer container, the volume container and/or the bottom cap further comprises at least one gasket.

14. A device according to claim 11, wherein the volume to be discharged of the device is adjusted by rotating the volume container in relation to the main container or by sliding the volume container upwards or downwards in relation to the main container; wherein the volume container and the outer container comprises cooperating first and second means to adjust the total volume of the device.

15. A device according to claim 14, wherein the first means is a vertical groove on the outside of the outer container and the second means is a projecting means that fits in the groove on the outer container.

16. A device according to claim 15, wherein the volume container comprises pre-defined positions deciding the volume to be discharged.

17. A device according to claim 11, wherein the annular grip portion is provided with reception means and the main container is provided with projecting means, and wherein the projecting means fits in the reception means.

18. A device according to claim 11, wherein the main container can be rotated by turning the annular grip portion and thereby align an opening of the main container with an opening of the outer container, whereby the volume to be discharged is transferred from the main container to the volume container.

19. A device according to claim 11, wherein the bottom of the main container and the outer container has a conical shape.

20. A device according to claim 11, wherein a graded scale is provided on any of the removable top cap, annular grip portion, main container, outer container, volume container, or bottom cap on the inside and/or outside to show the user the amount of content that will be discharged.

* * * * *